US00RE43288E

(19) United States
(12) Reissued Patent
Sund et al.

(10) Patent Number: US RE43,288 E
(45) Date of Reissued Patent: Apr. 3, 2012

(54) HIGH PURITY FLUID DELIVERY SYSTEM

(75) Inventors: Wesley E. Sund, Eden Prairie, MN (US); Joseph C. Dille, Telford, PA (US); Michael J. Barger, Sauderton, PA (US); Gary E. Pawlas, Louisville, CO (US)

(73) Assignee: Emerson Electric Co., St. Louis, MO (US)

(21) Appl. No.: 11/867,993

(22) Filed: Oct. 5, 2007
(Under 37 CFR 1.47)

Related U.S. Patent Documents

Reissue of:
(64) Patent No.: 7,114,517
Issued: Oct. 3, 2006
Appl. No.: 11/265,429
Filed: Nov. 1, 2005

U.S. Applications:
(62) Division of application No. 09/995,067, filed on Nov. 26, 2001, now abandoned.

(51) Int. Cl.
*G05D 7/06* (2006.01)

(52) U.S. Cl. ..... 137/487.5; 137/486; 137/209; 222/52; 222/63; 222/71; 222/389; 222/386.5

(58) Field of Classification Search ..... 137/12, 137/14, 206, 209, 487.5, 486; 222/52, 63, 222/71, 386.5, 389, 318; 451/60, 99, 446
See application file for complete search history.

(56) References Cited

U.S. PATENT DOCUMENTS

| | | | | | |
|---|---|---|---|---|---|
| 3,471,349 | A | * | 10/1969 | Bosworth et al. | 156/155 |
| 3,612,090 | A | * | 10/1971 | Kassel | 137/209 |
| 3,924,471 | A | * | 12/1975 | Singer | 73/864.35 |
| 3,945,539 | A | * | 3/1976 | Sossong | 222/386.5 |
| 4,372,304 | A | * | 2/1983 | Avakian et al. | 604/30 |
| 4,570,822 | A | * | 2/1986 | Procacino | 222/14 |
| 5,117,870 | A | * | 6/1992 | Goodale et al. | 137/636.1 |
| 5,148,945 | A | * | 9/1992 | Geatz | 222/1 |

(Continued)

FOREIGN PATENT DOCUMENTS

EP 0 772 027 5/1997

(Continued)

OTHER PUBLICATIONS

International Search Report for PCT/US 02/37778, mailed Feb. 20, 2003.

(Continued)

*Primary Examiner* — Stephen M Hepperle
*Assistant Examiner* — William McCalister
(74) *Attorney, Agent, or Firm* — The Ollila Law Group LLC

(57) ABSTRACT

A fluid delivery system includes a flow control device and a Coriolis mass flowmeter in fluid communication with the flow control device. The Coriolis flowmeter has a flow-tube made of a high-purity plastic material, such as PFA, making the delivery system suitable for high purity applications. A controller provides a control output signal to the flow control device, which may comprise a pinch valve, so as to vary the flow control device output in response to a setpoint signal and measurement signals received from the flowmeter.

22 Claims, 6 Drawing Sheets

U.S. PATENT DOCUMENTS

| | | | | |
|---|---|---|---|---|
| 5,157,975 | A * | 10/1992 | Tanaka et al. | 73/861.355 |
| 5,448,921 | A * | 9/1995 | Cage et al. | 73/861.357 |
| 5,520,213 | A * | 5/1996 | Muller | 137/375 |
| 5,555,190 | A * | 9/1996 | Derby et al. | 702/45 |
| 5,597,949 | A * | 1/1997 | Kalotay | 73/54.01 |
| 5,672,832 | A * | 9/1997 | Cucci et al. | 73/861.52 |
| 5,680,960 | A * | 10/1997 | Keyes et al. | 222/64 |
| 5,693,887 | A * | 12/1997 | Englund et al. | 73/723 |
| 5,852,244 | A * | 12/1998 | Englund et al. | 73/706 |
| 5,857,893 | A * | 1/1999 | Olsen et al. | 451/5 |
| 5,861,561 | A * | 1/1999 | Van Cleve et al. | 73/861.52 |
| 5,869,766 | A * | 2/1999 | Cucci et al. | 73/706 |
| 5,918,285 | A * | 6/1999 | Van der Pol | 73/861.357 |
| 6,048,256 | A * | 4/2000 | Obeng et al. | 451/60 |
| 6,073,495 | A * | 6/2000 | Stadler | 73/861.356 |
| 6,126,517 | A * | 10/2000 | Tolles et al. | 451/41 |
| 6,168,048 | B1 | 1/2001 | Xu et al. | |
| 6,213,853 | B1 * | 4/2001 | Gonzalez-Martin et al. | 451/287 |
| 6,293,849 | B1 * | 9/2001 | Kawashima | 451/41 |
| 6,298,868 | B1 * | 10/2001 | Dean et al. | 137/68.13 |
| 6,311,136 | B1 | 10/2001 | Henry et al. | |
| 6,358,125 | B2 | 3/2002 | Kawashima et al. | |
| 6,370,972 | B1 | 4/2002 | Bomber et al. | |
| 6,450,042 | B1 | 9/2002 | Lanham et al. | |
| 6,471,487 | B2 | 10/2002 | Keilty et al. | |
| 6,513,392 | B1 | 2/2003 | Barger et al. | |
| 6,544,109 | B1 | 4/2003 | Moore | |
| 6,606,917 | B2 | 8/2003 | Sund et al. | |
| 6,776,053 | B2 | 8/2004 | Schlosser et al. | |
| 6,783,309 | B2 * | 8/2004 | Makiyama | 409/136 |
| 7,005,019 | B2 | 2/2006 | Pawlas et al. | |
| 2002/0100505 | A1 * | 8/2002 | Keilty et al. | 137/487.5 |
| 2003/0097882 | A1 | 5/2003 | Schlosser | |

FOREIGN PATENT DOCUMENTS

| | | | |
|---|---|---|---|
| EP | 1 046 843 | | 10/2000 |
| EP | 1046843 | A | 10/2000 |
| EP | 1 115 047 | A1 * | 7/2001 |
| EP | 1182433 | | 2/2002 |
| JP | 2266191 | A | 10/1990 |
| JP | 04291119 | | 10/1992 |
| JP | 05026709 | | 2/1993 |
| JP | 5172044 | A | 7/1993 |
| JP | 6101774 | A | 4/1994 |
| JP | 06109503 | A | 4/1994 |
| JP | 7-130616 | | 5/1995 |
| JP | 9-303582 | | 11/1997 |
| JP | 09303609 | A | 11/1997 |
| JP | 10184961 | A | 7/1998 |
| JP | 2000105610 | A | 4/2000 |
| JP | 2001-441164 | | 2/2001 |
| WO | WO-09726509 | | 7/1997 |
| WO | WO 00/34748 | | 6/2000 |
| WO | WO 01/36918 | | 5/2001 |
| WO | WO 01/61285 | | 8/2001 |
| WO | WO-01/61285 | A | 8/2001 |
| WO | WO 01/65213 | | 9/2001 |
| WO | WO-01/65213 | A | 9/2001 |

OTHER PUBLICATIONS

Patent Abstracts of Japan vol. 017, No. 302 (P-1553); Publication No. 05026709, Publication Date Feb. 2, 1993; Coriolis Mass Flow Controller.

PCT Written Opinion for International Application No. PCT/US02/37778, Oct. 15, 2003.

* cited by examiner

HIGH PURITY FLUID DELIVERY SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a divisional of U.S. patent application Ser. No. 09/995,067, filed on Nov. 26, 2001, now abandoned which is incorporated by reference in its entirety.

BACKGROUND OF THE INVENTION

1. Field of the Invention

The present invention relates generally to fluid delivery systems, and more particularly, to improved fluid delivery systems and methods that are suitable for the direct application of ultra-pure fluids to a wafer surface in processes such as CMP, photolithography and dielectric processes.

2. Description of Related Art

Many industries such as semiconductor, pharmaceutical, and bio-technology experience fluid delivery problems due to the typically low flow rates, the use of abrasive and aggressive chemical fluids, and the need for contaminant free, accurate, compact, and real-time fluid delivery and/or blending systems.

Generally the semiconductor industry uses the word "tool" to refer to a system comprised of pieces of hardware that perform an operation on a wafer surface. These operations include the creation of thin films with some form of chemical deposition or fluid coating process, the etching of films in precise patterns, the polishing of films to reduce deposited films to a planar surface and the cleaning of surfaces to remove unneeded films, particles and chemical contaminants. The tool can either be stand alone or incorporated with other tools in a cluster structure where multiple sequential operations on the wafer are done in one location.

For example, Chemical-Mechanical Planarization (CMP) is a critical process in the semiconductor industry that involves a process to flatten the wafer surface of a semiconductor by applying an ultra-pure fluid containing small abrasive particles and a reactive agent between the wafer surface and a polishing pad. In most applications, the polishing pad rotates at a controlled speed against the wafer to flatten the surface. Over-polishing the wafer can result in altering or removing critical wafer structures. Conversely, under-polishing of the wafer can result in an unacceptable wafer surface. The polishing rate of the wafer is highly dependent upon the delivery rate of the fluid and the total amount of fluid delivered during a polishing operation.

In addition to fluid flow rate, prevention of contaminants in the fluid being applied to the polishing pad is critical. It is a problem in some applications that the instruments used to control the process are a source of contaminants to the process material. This is undesirable for use in systems where material an ultra high of purity must be delivered to a user's application. For example, the metal flow tube of a typical Coriolis flowmeter can be a source of contaminates. This is the case in the fabrication of semi-conductor wafers, which requires the use of material that is free of contaminants including ions migrating from the flow tube wall. This released material can cause the chips on a semi-conductor wafer to be defective. The same is true for a glass flow tube, which can release the leaded ions from the glass into the material flow. The same is also true for the flow tubes formed of conventional plastics.

Because prevention of ionic contaminants is critical, the majority of CMP processes utilize peristaltic pumps along with a suitable high purity tubing material to supply fluid to the polishing pad. While the clean flow path non-intrusive characteristic of peristaltic pumps is acceptable for CMP applications, the use of these pumps to attempt to control fluid flow rate is very inaccurate since they are operated open-loop with no flow measurement feedback Another process used in the semiconductor industry requiring accurate control of fluid flows and a contaminant free environment is the photolithography process. As is known in the art, photolithography is a process that applies a light sensitive polymer, known as resist, to the wafer surface. A photomask containing a pattern of the structures to be fabricated on the wafer surface is placed between the resist covered wafer and a light source. The light reacts with the resist by either weakening or strengthening the resist polymer. After the resist is exposed to light, the wafer is developed with the application of fluid chemicals that remove the weakened resist.

A modification of this process applies a host of new liquids to the wafer surface to create films that will become an integral part of the final semiconductor. The primary function of these films is to act as an insulator between electrical conducting wires. A variety of "spin-on" materials are being evaluated with a wide variety of chemical compositions and physical properties. The key difference between the lithography process and the spin-on deposition is that any defect in the film (such as a void, bubble or particle) is now permanently embedded in the structure of the semiconductor and could result in non-functioning devices and a financial loss for the semiconductor producer.

Both of these processes take place in a tool called a "track." The purpose of the track is to apply a precise volume of fluid to the surface of a stationary or slowly spinning wafer. After the liquid application, the wafer rotation speed is rapidly increased and the liquid on the wafer surface is spun off the edge. A very thin, consistent thickness of liquid remains from the center of the wafer to the edge. Some of the variables that affect liquid thickness include the resist or dielectric viscosity, solvent concentration in the resist or dielectric, the amount of resist/dielectric dispensed, speed of dispense, etc.

The track will also provide additional processing steps after liquid application that changes the liquid to a polymer using a bake process that also removes any solvent in the film. Dielectric films can also be exposed to other chemical treatments to convert the liquid film to the proper solid structure. The track also controls the environment around the wafer to prevent changes in humidity or temperature and chemical contaminants from affecting the performance of the film. Track system performance is determined by the accuracy and repeatability of liquid delivered to the wafer surface in addition to minimizing defects in the film caused by voids, bubbles and particles.

Problems associated with currently available fluid delivery systems used in processes such as CMP and spin-on applications include the inability to provide closed loop flow measurement, the inability to provide an accurate fluid delivery rate based on changing head pressure of the pump system, variances in the volume of tubing used in the pump, and pulsations from the pump. Further, periodic weekly or even daily calibration of the pump may be required. Other problems associated with current fluid delivery systems involve contamination of the fluid from shedding tubing particles.

Additional factors typically important in these industries include the need for real-time fluid property data such as flow rate, fluid temperature, viscosity, density and pressure. While all of the foregoing fluid properties can be measured using a combination of various instruments such as differential pressure transmitters, viscometers, densitometers, pressure transmitters, temperature elements or a combination of the instruments and a control system to calculate the fluid property values, the use these instruments can be expensive, have significant space requirements, require increased maintenance, and provide a greater potential for fluid leakage and process contamination. Therefore, there is a need for an efficient, compact and contaminant free solution to fluid delivery systems in the foregoing industries.

In other processes there is an increased need for a real-time blending system of multiple fluids requiring a high-purity flow path. In addition, blending based on a volumetric basis is generally unacceptable since typical blending formulas are based on molar ratios. Current blending methods include adding multiple fluids to a container on a weigh scale in an off-line manner, as shown in FIG. 1. Multiple fluids, A through N, flow into a container 11 placed on a scale 12. One fluid is allowed to run through a flow valve 13 at a time. The scale total is examined and when the desired amount of Fluid A has been added, the valve 13 is closed. The same process is repeated with the remaining fluids. Eventually, a total mixture is obtained. If too much or too little of any fluid has been added the process must continue until the proper mass of each fluid, within some acceptable error band, has been added.

Another known approach uses a level sensor to measure the volume of each fluid of the blend as it is being added to the vessel. This requires a very precise knowledge of the volume of the vessel with small increments of vessel height.

Unfortunately, the current batch production method can result in too much or too little of the final product being available when needed. Since having too little product available would shut a process down, extra product is always produced, meaning some product will be left over and not used. Since these products often have a limited shelf life (e.g. several hours) this excess product must be disposed of. This disposal is costly for several reasons. The product is typically uses very expensive chemicals, and the fluid mixture can often be very hazardous meaning it must be disposed of in a controlled and costly manner.

As technology develops, the need for manipulation of the blending formulas based on the differences in the product requirements, and additional new material components continues to increase, thus requiring a greater need for flexible, accurate and contaminant free real-time continuous blending systems. Another important factor includes the need for accurate pressure control to ensure proper blending and accurate fluid flow rates to the processing tool.

Thus, there is a need for fluid delivery systems that address shortcomings associated with the prior art.

SUMMARY OF THE INVENTION

In one aspect of the present invention a fluid delivery system includes a flow control device, a Coriolis mass flowmeter having a flow-tube made of a high-purity plastic material, and a controller, such as a PID controller. The Coriolis flowmeter provides output signals to the controller indicating, for example, mass flow rate, temperature, and/or density measurements of a process fluid. The control device receives a setpoint signal and the flowmeter output signals, and provides a control output signal to the flow control device to vary the control device's output in order to provide the desired flow rate for the fluid delivery system.

The Coriolis mass flowmeter's flow-tube is made of the high-purity plastic material to prevent transferring unwanted (e.g. metal) ions to the process fluid. Perfluoralky (PFA) plastic is a suitable material for the flow tube. The flow control device may be embodied by, for example, a control valve, a pump, or a controlled pressurized reservoir. In exemplary embodiments, the control valve is a pinch valve having a solenoid or stepper motor actuator.

In accordance with other aspects of the invention, a recirculating fluid distribution system includes a fluid reservoir and a distribution conduit in fluid communication with the reservoir. The distribution conduit has a plurality of tool drops for providing fluid from the reservoir to tools attached to the tool drops. A flow control device, such as a variable output pump or a pinch valve, is in fluid communication with a Coriolis mass flowmeter that has a flow-tube made of a high-purity plastic material. A pressure transmitter is in fluid communication with the Coriolis mass flowmeter. A controller receives a setpoint signal and output signals from the Coriolis flowmeter and the pressure transmitter, and provides a control output signal to the flow control device to vary the flow control device output to maintain a predetermined pressure and flow rate in the distribution conduit.

In accordance with still further aspects of the invention, a fluid delivery system, includes a reservoir having an inlet for receiving a gas to pressurize the reservoir and an outlet for dispensing fluid contained in the reservoir. A first flow control device is connected to the reservoir inlet and a second flow control device is in fluid communication with the reservoir outlet to control fluid flow out of the reservoir. A Coriolis mass flowmeter is in fluid communication with the second flow control device. The Coriolis flowmeter has a flow-tube made of a high-purity plastic material, such as PFA A controller receives a setpoint signal and output signals from the Coriolis flowmeter, and provides control output signals to the first and second flow control devices to vary the pressure of the reservoir and the flow rate of fluid from the reservoir.

BRIEF DESCRIPTION OF THE DRAWINGS

Other objects and advantages of the invention will become apparent upon reading the following detailed description and upon reference to the drawings in which.

Figure 2:
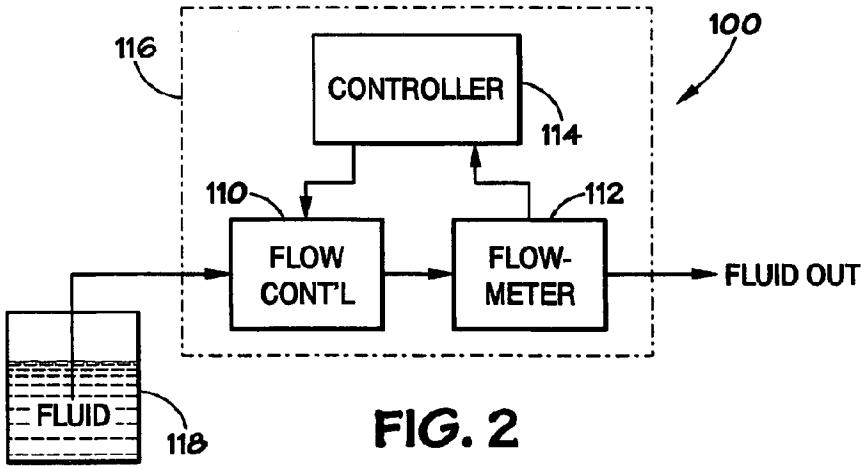
FIG. 2 is a block diagram schematically illustrating a fluid delivery system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 2 schematically illustrates a fluid delivery system 100 in accordance with exemplary embodiments of the invention. The mass flow-based delivery system 100 is suitable, for example, to control the flow of fluid to a tool or a work piece supported by a tool, such as a polishing pad of a CMP system or a track used for semiconductor spin-on applications. In general, the system 100 includes a flow control device 110, a mass flowmeter 112, and a controller 114.

The controller 114 receives a setpoint signal representing a desired parameter, such as mass flow rate. The controller 114 also receives an output signal from the flowmeter 112. The flowmeter signal is conditioned and processed by the controller 114, which then provides a control output signal to the flow control device 110 so as to vary the fluid flow rate. The controller 114 is electronic and has an electronic interface, and may comprise, for example, a proportional-integral-derivative (PID) controller. The setpoint input to the controller 114 is typically an electronic signal, such as a 0–5V, 4–20 mA signal or a digital word. A pneumatic setpoint interface could also be used. The controller 114 may also include a valve override feature, where an additional signal is sent into the controller 114 that causes the controller 114 to ignore the setpoint and fully open or close the flow control device 110. This feature is often used for shutting the flow off or purging the system.

In certain embodiments, such as fluid delivery systems for chemical blending applications, the mass flowmeter 112 is preferably a Coriolis mass flowmeter. A direct mass flowmeter is generally preferable over a volumetric flowmeter since the desired chemical reactions typically are driven on a mole (mass) basis. Volumetric flow rate measurements can be made and corrected to standard conditions resulting in the equivalent of a mass measurement. However, additional information is required (fluid density, temperature, and/or pressure) making the measurement more difficult and costly. Mass flow rate measurements are typically more accurate than volumetric measurements which are converted to a mass measurement and, this accuracy results in a higher quality final product. This would increase the process yield and thus improve the profitability of companies utilizing this invention.

Many applications, such as those associated with the semiconductor, pharmaceutical, and bio-technology industries, require the flow path (all surfaces wetted by the process fluid) of fluid delivery systems be constructed of high purity, chemically inert/resistant, materials to protect the purity of the chemicals used. Plastics are desirable because the ultra pure chemicals used in the semiconductor wafer fabrication processes can be contaminated if metal ions are leached or removed from metal flow tubes due to a variety of mechanical and chemical processes. High purity grade plastics are thus used in these industries since this generally prevents transferring unwanted (e.g. metal) ions to the process material. In addition, the smooth surface finish inherent in the manufacturing of a plastic flow tube reduces the ability of bacteria to attach to the tube and contaminate the fluid with organic materials.

The wetted path of the flowmeter 112 is designed such that it has no cracks, crevices, etc. that could harbor bacteria. A suitable high purity plastic is PFA (perfluoroalkoxy copolymer), which is an advanced fluoropolymer with superior chemical resistance and mechanical properties. A variety of fluorinated polymers such PVDF and PTFE are also suitable.

In addition to using high purity materials, the high purity flow path should have a constant diameter and no intrusions or multiple flow paths—a dual tube sensor or a curved flow path should be avoided. This minimizes pressure drop, reduces the shear rate on the fluid to a minimum, which is critical in some industries and applications. It also prevents plugging with certain materials, such as slurries.

Figure 3:
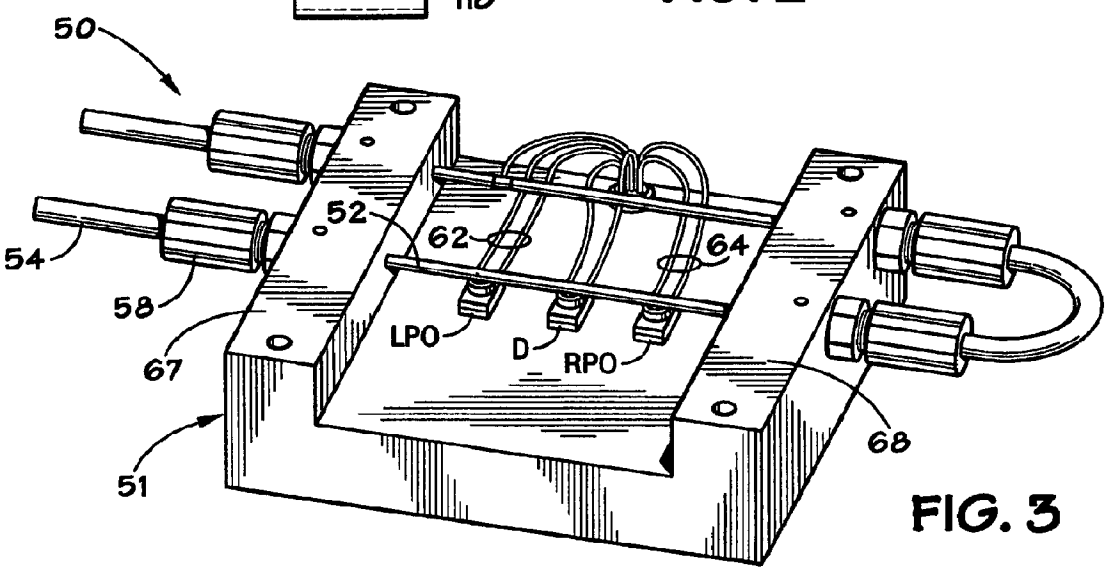
FIG. 3 is a perspective view of a Coriolis flowmeter having a high purity flow tube suitable for use in the various embodiments of the present invention.
Figure 1:
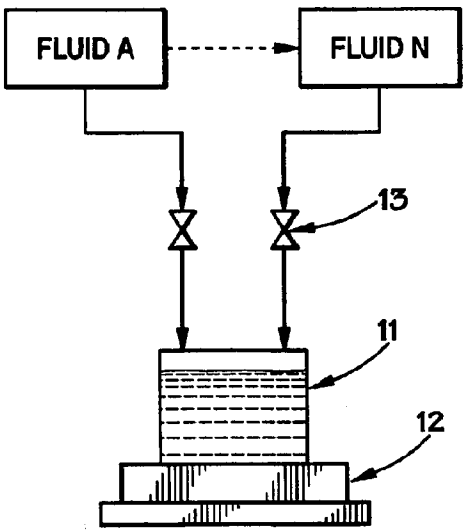
FIG. 1 (PRIOR ART)
FIG. 1 schematically illustrates a prior art off-line blending system.

A suitable Coriolis mass flowmeter having a flow-tube made of a high-purity plastic material is shown in FIG. 3. The Coriolis flowmeter 50 has a flow tube 52 inserted through legs 67, 68 of a base 51. The flow tube 52 is preferably made of PFA. Pick offs LP0 and RP0 and a driver D are coupled to the flow tube 52. The flowmeter 50 receives a process material flow from a supply tube 54 and extends the flow through a connector 58 to the flow tube 52. The flow tube 52 is vibrated at its resonant frequency with material flow by the driver D. The resulting Coriolis deflections are detected by pick offs LP0 and RP0 which apply signals over conductors 62 and 64 to meter electronics (not shown), which determines the phase difference between the Coriolis deflections and applies output signals based thereon. *As shown in FIG. 2, the output signal may correspond to a reservoir output flow from the reservoir 118.* Suitable Coriolis flowmeters having high purity flow tubes are disclosed in detail in the incorporated application entitled "Flowmeter for the Precision Measurement of an Ultra-Pure Material Flow."

The flow control device 110 may comprise a control valve. As with the mass flowmeter 112, in high purity applications the control device must be made of materials that will minimize contamination of the fluid. Moreover, the control device 110 should be designed to have no places where stagnant fluid can collect and no sliding or rubbing parts that could create particles in the fluid.

For example, an all-plastic diaphragm valve made from plastics that are acceptable in high purity chemical environments could be used. For slurries, however, such a valve is not the ideal solution. Pinch valves have proven to be a good solution to slurry control. A suitable pinch valve 120 in accordance with the present invention is conceptually illustrated in FIG. 4. An actuator 122 forces a ram 124 onto a flexible tube 126 and against a reference surface 128 to pinch the tube 126 closed. The tube 126 is preferably made of a high purity plastic such as PFA. The tube's flexibility allows the tubing walls to conform around any trapped particles or imperfections in the walls to provide a tight seal. The flow path is straight through, mining pressure drop and turbulence. The fluid contacts only the flow tube 126 preventing wear or corrosion of the other valve parts and preventing metal contamination of the slurry in the case of high purity applications, such as semiconductor polishing operations.

The actuation of known pinch valves is usually bi-stable—on and off. Some known pinch valves have a manual actuator with a multi-turn handle, but this type of valve would not be conducive to closed loop flow control. Other pinch valves are used for dispensing applications in batch processes, in which the amount of material dispensed is controlled by the time that the valve is on. This does not allow dynamically controlling the flow rate.

A valve that has only two states can be controlled by applying varying current or voltage to the valve actuator. In one embodiment, pulse-width modulation (PWM) is used to control the valve. PWM is achieved by generating a square wave signal at a frequency above the valve's mechanical response frequency. The duty cycle of the signal is varied to determine the appropriate voltage or current sent to the device. For example, if the PWM signal operates between 0–12 volts, 0% duty cycle=0 volts, 50% duty cycle=6 volts, and 100% duty cycle=12 volts. The "averaging" takes place because the signal is at a frequency above the valve's mechanical response frequency. The position of the valve is based on the average current that is supplied. The resulting supply voltage is proportional to the pulse width of the signal.

If the signal frequency is too low, the valve will have time to respond completely to on and off signals creating a pulsed flow output, which is generally not desirable. A typical pinch valve actuator is a solenoid, which has a spring element with a preload adjustment that determines the current required to close the solenoid. Adjusting the pre-load on the valve spring can improve the valve's control range. In other implementations, the solenoid plunger element is replaced with a spring-suspended plunger. The spring-suspended plunger minimizes the non-linear valve response due to friction, which minimizes the hysteresis and dead band common in available solenoid-actuated pinch valves.

An alternative approach to the PWM-controlled solenoid is to use a stepper motor actuator, which translates a controlled, deterministic angular rotation to a linear ram drive by a worm gear type arrangement. Stepper controllers can be designed to produce a specific number of steps proportional to an analog signal input. Backlash, and thus valve hysteresis can be minimized by any number of appropriate worm gear designs that minimize backlash. A stepper motor generally provides immunity to temperature and pressure fluctuations, which may cause changes in the pinch tubing. A stepper motor is a means to control position, so the stepper is immune changes in the pinch tubing. With a pinch valve, the pinch tube is an integral part of the system—current is applied to the valve actuator, which applies force to the pinch tube, which pinches the tube. If the tube properties change due to temperature or pressure, the amount the tube closes, and thus the flow rate with a solenoid, changes. Moreover, a stepper actuator can remain at the last position to provide fast response to achieving setpoint at the start of a fluid delivery cycle.

The Coriolis flowmeter 112 and flow control device 110 may be configured as an integral unit, housed in a single enclosure 116, and additionally the controller 114 may also be housed in the same enclosure 116 to provide an integrated high purity, Coriolis mass flow controller. A suitable high purity, Coriolis mass flow controller is disclosed in additional detail in the incorporated application entitled "High Purity Coriolis Mass Flow Controller."

Alternatively, the flow control device 110 may comprise a variable output pump, such as a peristaltic pump. In still further embodiments, a pressurized vessel or reservoir in which the pressure is varied to change the flow rate of fluid dispensed from the vessel functions as the flow control device 110. For example, referring to FIG. 2, a fluid reservoir 118 may be variably pressurized to vary the flow rate of fluid exiting the reservoir 118. Controlling the fluid flow rate in this manner may be in addition to, or in place of, the illustrated flow control device 110. Such alternative flow control devices are discussed in further detail herein below in conjunction with further exemplary embodiments of the invention.

Figure 5:
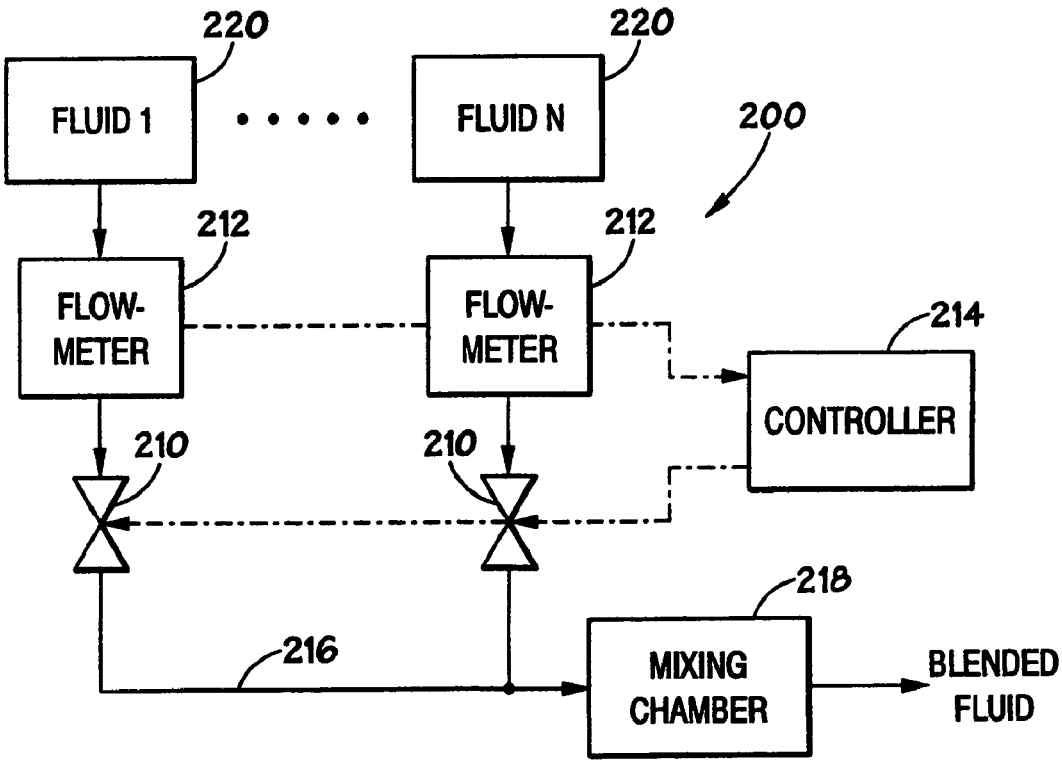
FIG. 5 is a block diagram illustrating aspects of a real-time, high purity blending system in accordance with embodiments of the present invention.

FIG. 5 illustrates a real-time blending system 200 in accordance with aspects of the present invention. The illustrated system is high purity, corrosion resistant and mass based to address shortcomings associated with the prior art. At least two key factors are needed to achieve these features. One is a high purity flow path, and another is a mass flow rate measurement. Accordingly, the system 200 includes Coriolis flowmeters 212 having high purity plastic flow tubes as described above. The Coriolis flowmeters 212 provide a density measurement that may be used as a feedback of the actual blend concentration when the blend is a binary solution of a heavy component such as an acid with water. Solids concentration in a slurry can also be monitored using the density measurement. In addition to mass flow rate and density, the flowmeters 212 may be configured to provide additional measurement output signals, such as a temperature measurement.

Using the mass flowmeters 212 allows real-time, on-line blending of multiple fluid streams 220. As noted above, a mass flow rate measurement is preferred over a volumetric flow rate measurement since the desired chemical reactions are typically driven on a mole (mass) basis.

The real time blending system 200 further includes flow control devices 210, such as the pinch valves described above. The flowmeters 212 provide output signals indicative of, for example, fluid flow rate, temperature and density to the controller 214. Based on pre-determined or real-time fluid stream flow rate setpoint parameters, the controller 214 sends control signals to the flow control devices 210 in order to supply the desired amount of blended fluid to a work piece. In this manner, the various fluids 220 are merged to form a single fluid stream that is provided to a common conduit 216. A mixing chamber 218 may further be provided to achieve complete blending of the fluids 220. Additionally, check valves (not shown) may be provided to ensure the individual fluid streams 220 are not contaminated due to variations in fluid stream supply pressures.

Figure 4:
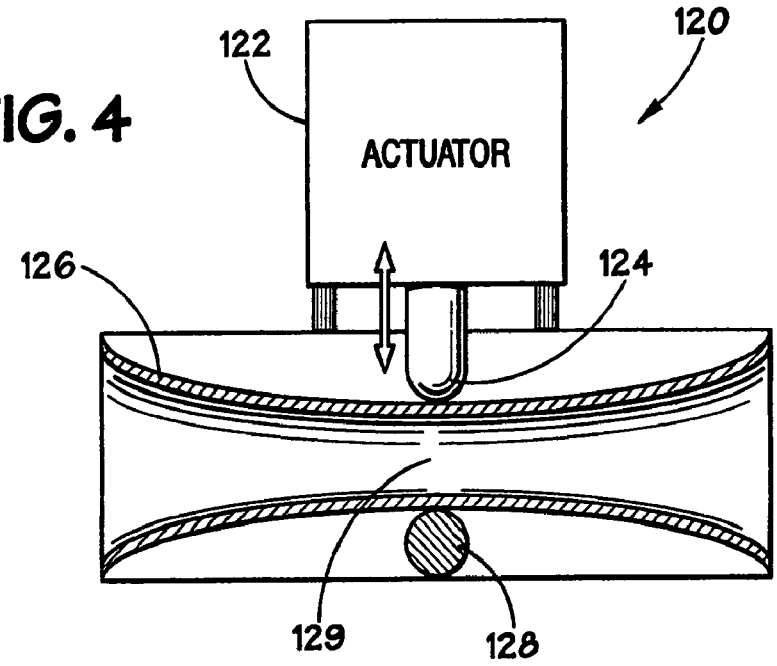
FIG. 4 schematically illustrates a pinch valve in accordance with the present invention.

A man-machine-interface (MMI) may further be provided. The MMI provides an interface that, for example, communicates the values and status of input and output signals as well as providing predetermined alarms when the value of a programmed input signal or other measurement falls outside of an accepted range of values. In addition, the input and output signals between the various components of the system 200 can all be connected over a single pair fieldbus cable. Further, in certain embodiments, the system is also capable of calibration, testing and maintenance of the system via the controller 214, as well as configuration and selection of the pre-configured blending recipes. While the system 200 invention as illustrated in FIG. 4 shows the flowmeter 212, flow control device 210 and controller 214 as separate components, it should be appreciated that various combinations of these components may be configured as an integral unit in a common enclosure.

Figure 6:
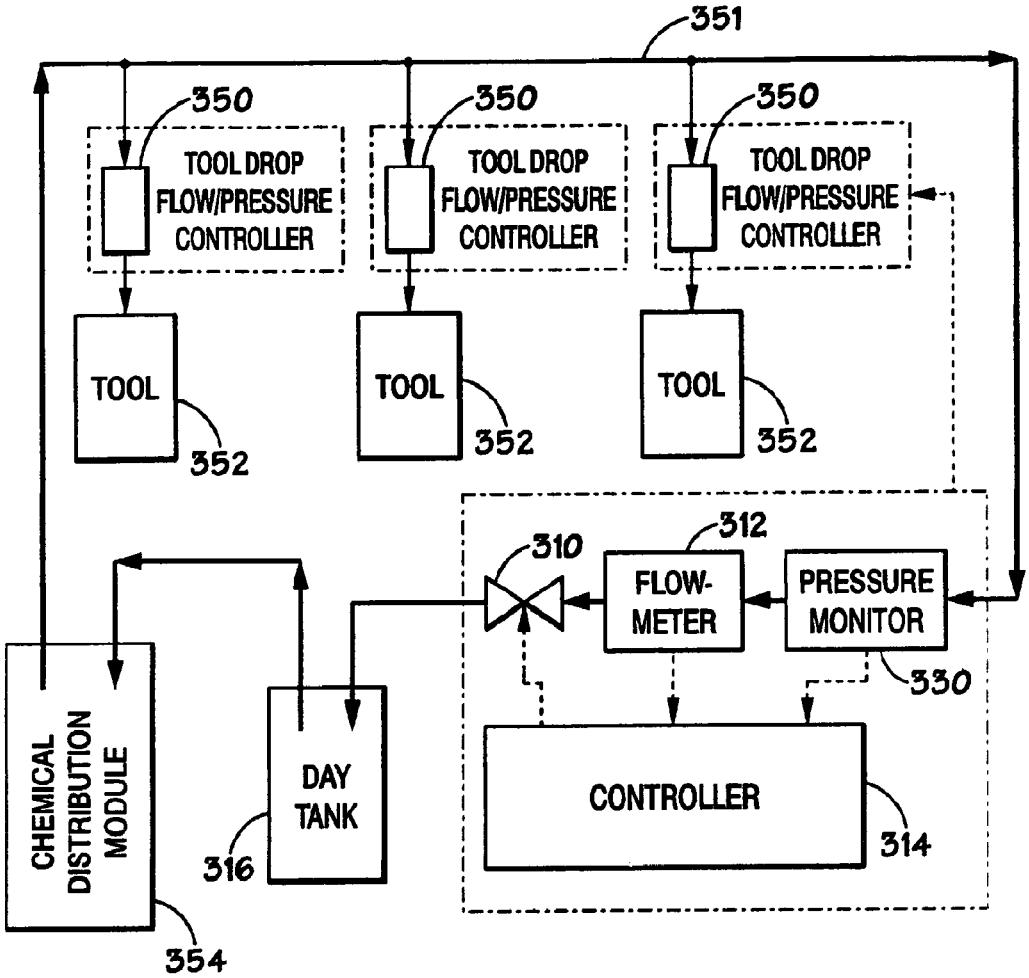
FIG. 6 is a block diagram illustrating a recirculating fluid distribution system in accordance with embodiments of the present invention.

A recirculating fluid distribution system 300 is illustrated in FIG. 6. The distribution system 300 includes a Coriolis flowmeter 312 having a flow tube made of a high purity plastic material as discussed above. The flowmeter 312 is in fluid communication with a flow control device, such as a pinch valve 310, and a pressure transmitter 330. A controller 314 receives measurement signals from the flowmeter 312 and the pressure transmitter 330, and provides a control signal to the valve 310. The controller 314, Coriolis flowmeter 312, pressure transducer 330 and valve 310 may be individual components, or may be combined as an integral flow and pressure control system.

A reservoir 316 contains fluid to be delivered to a plurality of tool drops 350 via a conduit 351. The tool drops 350 are each connectable to a respective tool 352 such as a cleaning, etching or CMP tool to provide fluid to the tool 352. A distribution module 354, such as a pump, circulates fluid from the reservoir 316 through the system 300. Alternatively, an inert gas such as nitrogen may be supplied to the reservoir 316 to pressurize the reservoir 316 and circulate the fluid.

The Coriolis mass flowmeter 312 allows a user to monitor flow rate in the system 300. Via the mass flow and pressure control system, a minimum pressure can be maintained at each of the tool drops 350 to eliminate pressure based dispense fluctuations that could affect the performance of the associated tools 352. A miniaturized version of the pressure/flow controller can be used to maintain a pressure and mass flow rate to each tool to compensate for variations in loop pressure. Such pressure/flow controllers associated with each tool could be individually operated, or the controller 314 could act as a master controller.

As noted above, the Coriolis mass flowmeter 312 can provide a density measurement which can be used as a feedback of the actual blend concentration when the blend is a binary solution of a heavy component such as an acid with water. Solids concentration in a slurry can also be monitored using the density measurement.

Paste

Figure 7A:
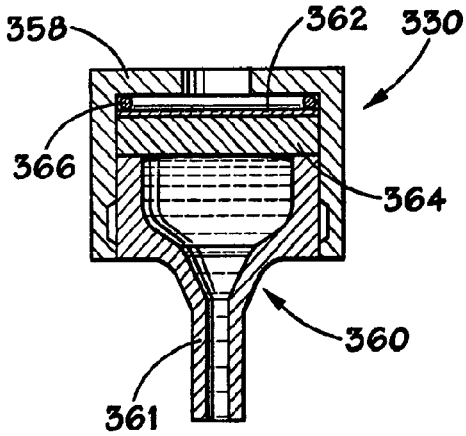
FIG. 7A schematically illustrates a high purity pressure transmitter in accordance with aspects of the present invention.

As noted above, to achieve a high purity system the entire flow path must be made of a high purity, chemically inert/resistant material. FIG. 7A schematically illustrates a high purity pressure transmitter 330 with the wetted process connection including the pressure diaphragm constructed out of a single piece of high purity plastic. A key requirement of any instrumentation used in a high purity distribution system is that none of the devices can be a source of leaks. Threaded connections are avoided; the preferred method of making process connections is the use of a face to face seal. Fabricating the process connection 360 out of a single piece of plastic assures that there are no threaded connections, which can be a source of leaks.

The pressure transmitter 330 includes a sensor holder 358, which may be constructed of polypropylene since it is not part of the flow path. A pressure chamber 360 constructed of a high purity material such as PFA is nested in the sensor holder 358. The pressure chamber 360 defines a process fluid in-take guide 361 extending therefrom. To provide stable pressure measurement performance, a ceramic pressure sensor 362 is bonded to a high purity diaphragm 364 (for example, 1 mm thick PFA) and any relaxation of the plastic (also called creep) is compensated for by elastomer o-rings 366 situated on top of the ceramic sensor 362, which maintains the ceramic sensor against the plastic diaphragm 364 with a constant force. In this manner, the entire wetted part of the pressure transmitter 330 is PFA or another suitable high purity plastic material.

Figure 7B:
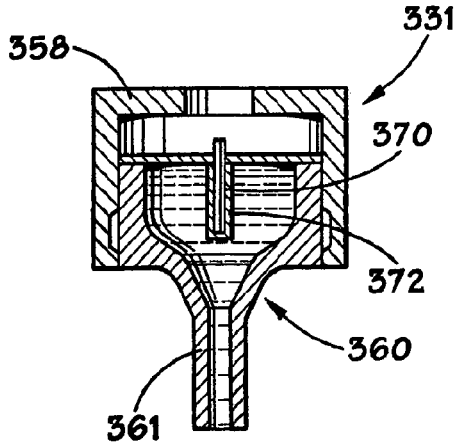
FIG. 7B illustrates an alternative embodiment of a high purity pressure transducer containing an encapsulated sapphire sensor.

An alternative pressure sensor 331 is shown in FIG. 7B. The pressure sensor 331 uses a small capacitance pressure sensor 370 constructed from sapphire. The sensor is encapsulated in a high purity material such as PFA 372 and extends into the pressure chamber 360 in such a way that the fluid pressure squeezes the sensor 370. An advantage of the approach shown in FIG. 8B is no fixed reference, such as a sturdy structure, is required for accurate pressure measurement. The encapsulated pressure sensor 370 is an integral part of the pressure chamber 360 and is constructed out of a single piece of high purity plastic.

Figure 8:
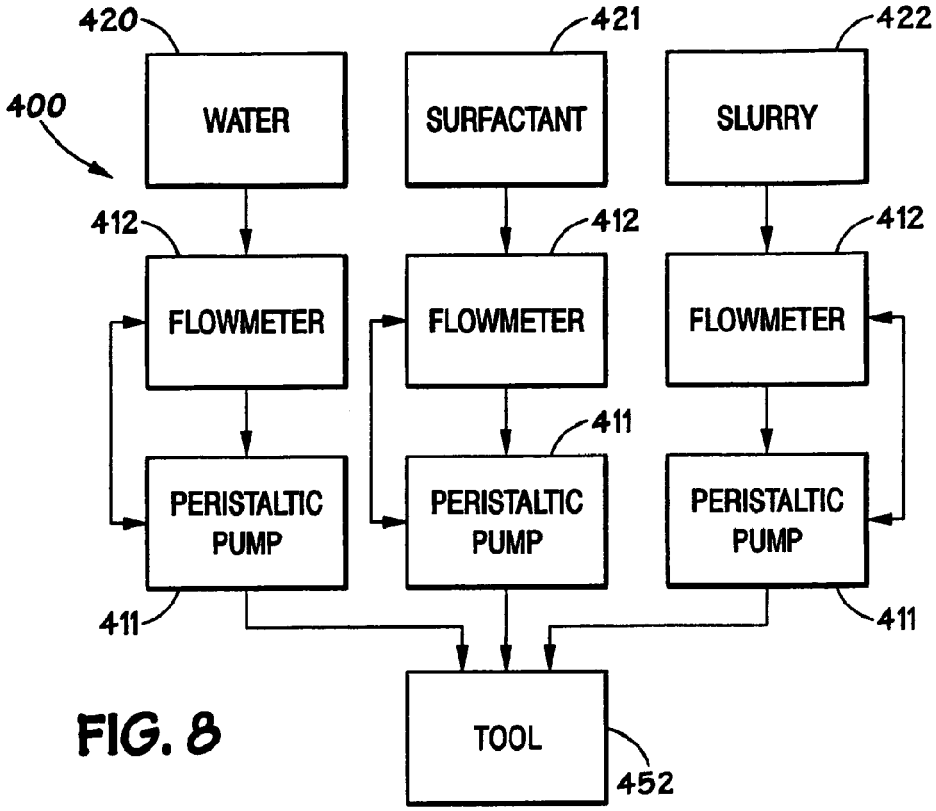
FIG. 8 is a block diagram conceptually illustrating aspects of a high purity fluid delivery system for a CMP process tool in accordance with embodiments of the present invention.

FIG. 8 is a block diagram conceptually illustrating aspects of a high purity fluid delivery system 400 for a CMP process tool in accordance with aspects of the invention. The delivery system 400 provides various fluids, for example, water 420, surfactant or reactive agent 421 and slurry 422, to a process tool 452 for application to a semiconductor wafer. The tool typically includes a wafer support and a polishing pad. Peristaltic pumps 411 are in communication with each of the fluid sources 420,421,422 to pump the respective fluids to the tool 452. Further, high purity Coriolis flowmeters 412 are placed in-line with each fluid source to provide mass flow rate feedback. A closed loop system can then be achieved through the use of control electronics and/or software, such as a PID controller.

Figure 9:
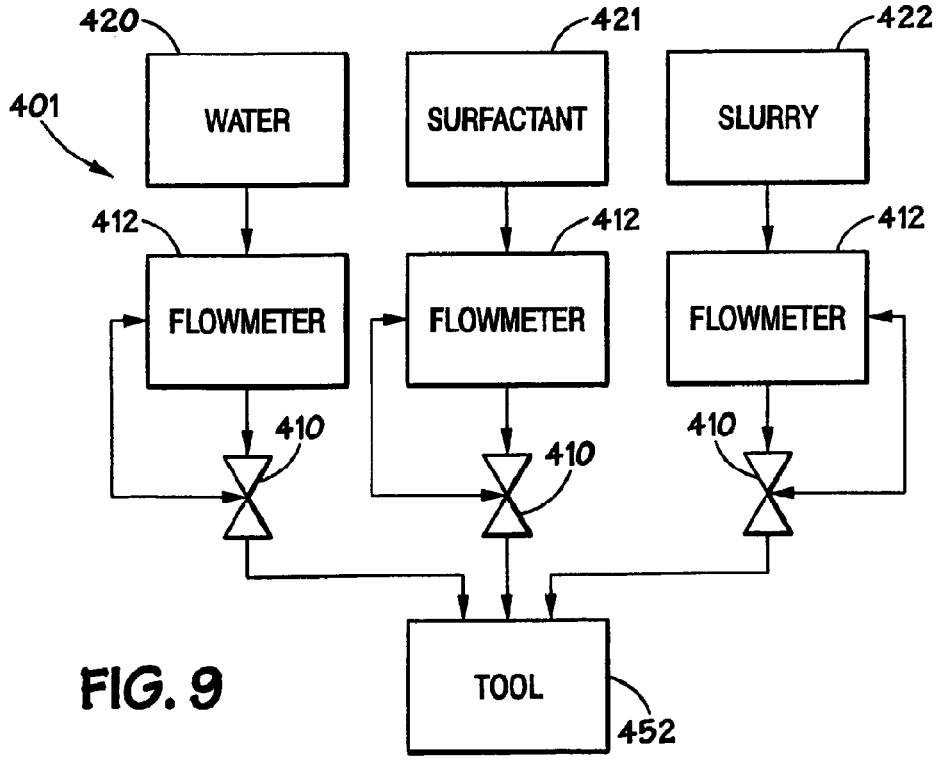
FIG. 9 is a block diagram conceptually illustrating aspects of an alternative high purity fluid delivery system for a CMP process tool in accordance with embodiments of the present invention.

Another fluid delivery system 401 is shown in FIG. 9, in which control valves 410, such as the pinch valve disclosed herein above, are used in conjunction with the high purity Coriolis mass flowmeters 412 to achieve high purity, closed loop control in a CMP process. In certain embodiments, the process tool 452 could supply an on-off signal to each individual fluid control loop if the control loops are set at a desired flowrate.

Different wafers, however, may need to be processed differently and thus require a different "recipe" of fluids be delivered to the polishing pad. The CMP process tool 452 could command a particular flow rate by using, for example, standard industry protocols such as a 4–20 mA signal, to each controller. As in the system 300 shown in FIG. 6, the CMP tool could merely command a different recipe and the controller 314 device would control the delivery rates. The main controller 314 sets flow rates and fluid ratios in real-time as necessary.

Figure 10:
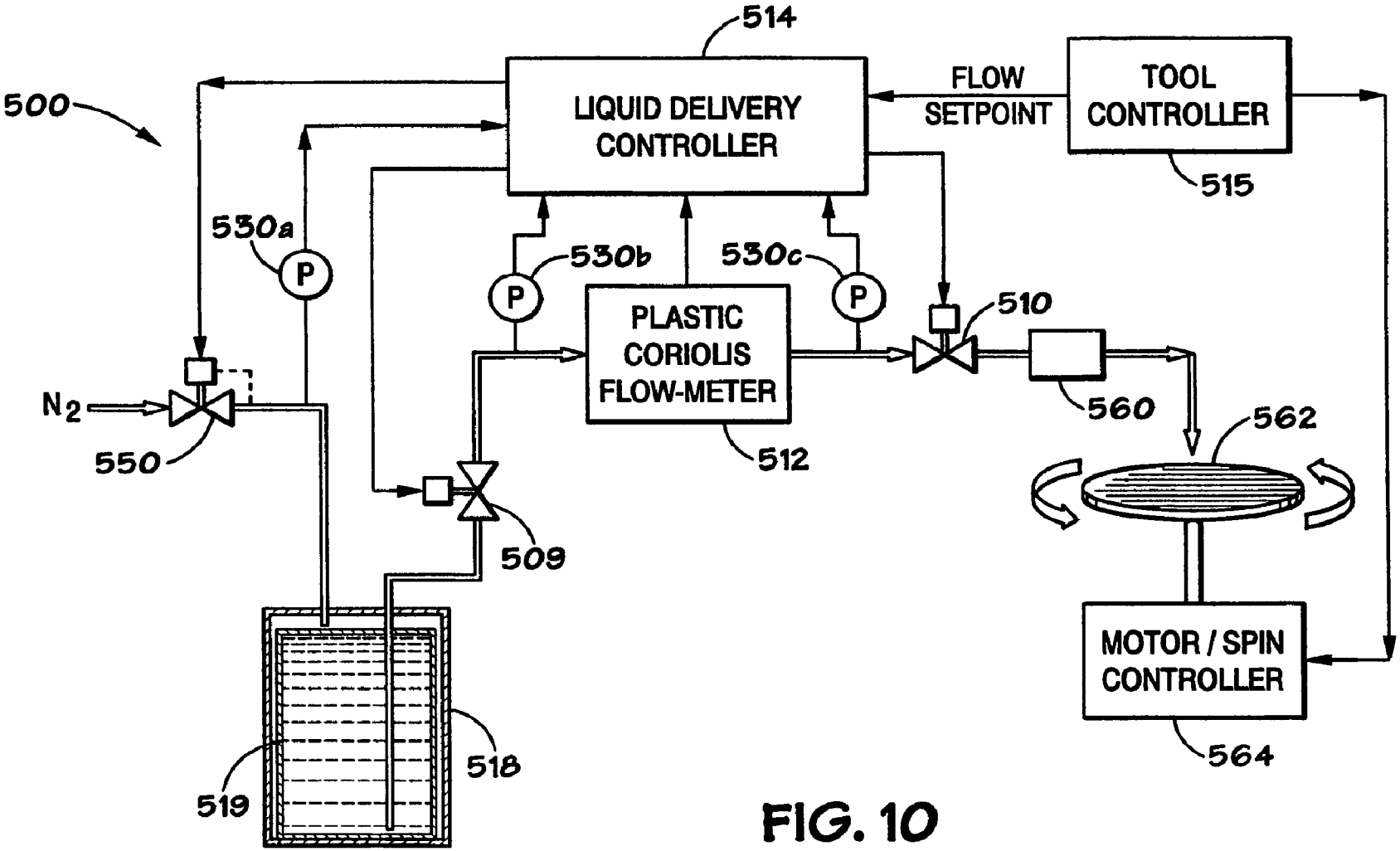
FIG. 10 is a block diagram illustrating a closed-loop fluid delivery system for a spin-on process in accordance with embodiments of the present invention.

FIG. 10 shows a closed-loop fluid delivery system 500 for a spin-on process used in a photoresist or dielectric liquid application process. A reservoir 518 is pressurized with an inert gas, such as nitrogen, which is supplied via a supply conduit. The process fluid in the reservoir 518 may be contained within a polymer bag 519 to isolate the fluid from the pressurizing gas. In other embodiments, a diaphragm may be used to isolate the process fluid from the gas. A pressure control valve 550 is located within the inert gas supply conduit to controllably adjust the inert gas being supplied to the reservoir 518. The pressure control valve 550 is capable of receiving an output signal from a liquid delivery controller 514 that adjusts the position of the valve 550 from open to close based on a pressure signal received from a first pressure transmitter 530a. The controller 514 adjusts the position of the pressure control valve 550 to increase or decrease the pressure of the reservoir 518, based on a predetermined pressure setpoint compared to the output of the pressure transmitter 530a.

The reservoir 518 is connected to a high purity Coriolis mass flowmeter 512 via an outlet conduit, through which the process fluid exits the reservoir 518. A point of use filter 560 is provided to filter process fluid being applied to a spinning work piece 562, which is controlled by a spin controller 564.

The Coriolis flowmeter 512 in the flow path measures the actual flow rate and provides a signal to the liquid delivery controller 514. If the flow of fluid is low the pressure applied to the liquid inside the reservoir 518 is increased to provide more flow. Increased pressure for liquid delivery may be necessary due to plugging of the point of use filter 560 or in the tubing carrying the liquid. Second and third pressure sensors 530b,530c upstream and downstream of the flowmeter 512 measure the differential pressure required to drive the liquid through the flowmeter 512. The flow rate and differential pressure measurements provided by the flowmeter 512 and pressure sensors 530b,530c can be used to determine the viscosity of the fluid, since the length of the tube is known. The viscosity measurement would indicate any changes to the chemical structure of the fluid. A control valve 510 controls the flow rate of the process fluid via control signals from the liquid delivery controller 514. A stepper driven valve would maintain last position.

A tool controller 515, which may be the same controller as the liquid delivery controller 514 or a separate controller, provides control signals to the spin controller 564 and also provides a flow setpoint to the delivery controller 514. A fast acting fluid on/off valve 509 is further provided at the outlet of the reservoir 518 in some embodiments, which is activated by the liquid delivery controller 514 to turn flow on/off based on the requirements from the tool controller 515. The liquid delivery controller 514 maintains in memory a table of liquid delivery pressure and flow rates as would be provided by the pressure sensor 530b and Coriolis flowmeter 512, respectively, correlated with various positions of the control valve 510. Based on fluid demand requirements from the tool controller 515, the liquid delivery controller 514 provides optimal settings of pressure on the fluid and control valve settings to provide the proper amount of fluid during the time the valve 509 is open.

Figure 11:
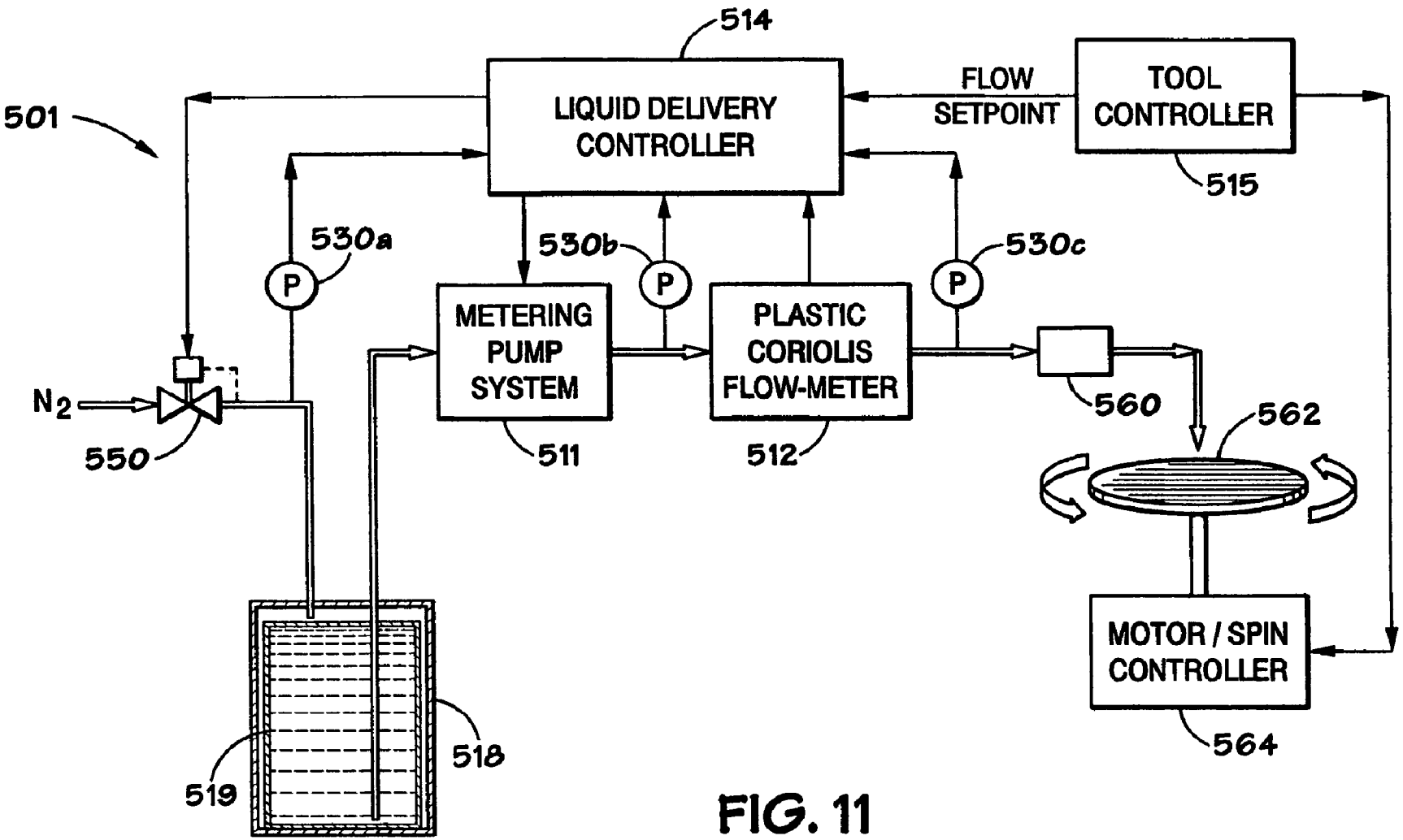
FIG. 11 is a block diagram illustrating an alternative closed-loop fluid delivery system for a spin-on process in accordance with embodiments of the present invention.

An alternative spin-on fluid delivery system 501 is shown in FIG. 11. In the delivery system 501, the Coriolis flowmeter 512 is downstream of a metering pump 511 to act as a feedback mechanism to assure that the proper amount of liquid is being applied to the work piece 562. Prior art metering pump systems are typically open loop, and any plugging of the system downstream of the pump that increases the head pressure will change the fluid delivery to the work piece. The signal from the Coriolis flowmeter 512 allows the liquid delivery controller 514 to change the operation of the pump 511 to provide a higher output pressure to compensate for the increased head pressure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A fluid delivery system, comprising:

a reservoir having an inlet for receiving a gas to pressurize the reservoir and an outlet for dispensing fluid contained in the reservoir, *with the reservoir including a flexible liner that holds the fluid and prevents the gas from passing into the fluid delivery system*;

a first flow control device connected to the reservoir inlet;

a first pressure transmitter connected to the reservoir inlet, the first pressure transmitter providing [an output] *a reservoir inlet pressure* signal;

a second flow control device in fluid communication with the reservoir outlet to control fluid flow out of the reservoir;

a second pressure transmitter connected to the reservoir outlet, the second pressure transmitter providing [an output] *a reservoir outlet pressure* signal;

a Coriolis mass flowmeter in fluid communication with the second flow control device, the Coriolis flowmeter having a flow-tube made of a high-purity plastic material, the Coriolis flowmeter providing [an output signal] *a mass flow rate output signal of a reservoir output flow from the reservoir and providing a density measurement for the fluid*;

a controller receiving a setpoint signal, the controller receiving the [output signals] *reservoir inlet pressure signal* from the first [and second pressure transmitters and] *pressure transmitter, the reservoir outlet pressure signal from the second pressure transmitter, and the mass flow rate output signal and the density measurement from* the Coriolis flowmeter and providing control output signals to the first and second flow control devices to vary the pressure of the reservoir and the flow rate of fluid from the reservoir.

2. The fluid delivery system of claim 1, wherein the high-purity plastic material comprises PFA.

3. The fluid delivery system of claim 1, wherein the second flow control device comprises a valve.

4. The fluid delivery system of claim 3, wherein the valve comprises a pinch valve.

5. The fluid delivery system of claim 4, wherein the pinch valve comprises:

an actuator having a ram operatively connected thereto;

a reference surface positioned generally opposite the ram;

a high purity, flexible tube positioned between the ram and the reference surface.

6. The fluid delivery system of claim 5, wherein the actuator comprises a solenoid.

7. The fluid delivery system of claim 5, wherein the actuator comprises a stepper motor.

8. The fluid delivery system of claim 1, wherein the second flow control device comprises a pump having a variable output.

9. The fluid delivery system of claim 8, wherein the pump comprises a peristaltic pump.

[10. The fluid delivery system of claim 1, wherein the reservoir includes a bag situated therein for containing a fluid.]

11. The fluid delivery system of claim 1, wherein the controller comprises a PID controller.

12. The fluid delivery system of claim 1, wherein the output signal provided by the Coriolis mass flowmeter includes a mass flowrate measurement.

[13. The fluid delivery system of claim 1, wherein the output signal provided by the Coriolis mass flowmeter includes a fluid density measurement.]

14. The fluid delivery system of claim 1, wherein the output signal provided by the Coriolis mass flowmeter includes a fluid temperature measurement.

*15. A fluid delivery system, comprising:*

*a reservoir having an inlet for receiving a gas to pressurize the reservoir and an outlet for dispensing fluid contained in the reservoir, with the reservoir including a flexible liner that holds the fluid and prevents the gas from passing into the fluid delivery system;*

*a first flow control device connected to the reservoir inlet;*

*a second flow control device in fluid communication with the reservoir outlet to control fluid flow out of the reservoir;*

*a second pressure transmitter connected to the reservoir outlet, the second pressure transmitter providing a reservoir outlet pressure signal;*

*a Coriolis mass flowmeter in fluid communication with the second flow control device, the Coriolis flowmeter having a flow-tube made of a high-purity plastic material, the Coriolis flowmeter providing mass flow rate output signal of a reservoir output flow from the reservoir and providing a density measurement for the fluid;*

*a third pressure transmitter connected to a Coriolis mass flowmeter output and generating a Coriolis flowmeter output pressure; and*

*a controller receiving a setpoint signal and receiving the reservoir outlet pressure signal from the second pressure transmitter, the Coriolis flowmeter output pressure from the third pressure transmitter, and the mass flow rate output signal and the density measurement from the Coriolis mass flowmeter, the controller providing control output signals to the first and second flow control devices to vary the pressure of the reservoir and the flow rate of fluid from the reservoir, and the controller determining a fluid viscosity from the mass flow rate, the reservoir outlet pressure, and the Coriolis flowmeter output pressure.*

*16. The fluid delivery system of claim 15, wherein the second pressure transmitter is connected to the reservoir outlet upstream of the Coriolis mass flowmeter.*

*17. The fluid delivery system of claim 15, further comprising a first pressure transmitter located at the inlet of the reservoir.*

*18. The fluid delivery system of claim 17, wherein the controller calculates the viscosity of fluid flowing through the system.*

*19. The fluid delivery system of claim 15, wherein the controller further controls a tool for processing a work piece.*

*20. The fluid delivery system of claim 15, wherein the controller comprises a fluid delivery controller, the system further comprising a tool controller that controls a tool for processing a work piece, the tool controller providing the setpoint signal to the fluid delivery controller.*

*21. The fluid delivery system of claim 15, further comprising a filter connected to the reservoir outlet.*

*22. The fluid delivery system of claim 15, wherein the second flow control device comprises a pinch valve.*

*23. The fluid delivery system of claim 15, wherein the second flow control device comprises a metering pump.*

*24. The fluid delivery system of claim 1, further comprising a third pressure transmitter connected to the Coriolis mass flowmeter output and generating a Coriolis flowmeter output pressure, wherein the controller receives the Coriolis flowmeter output pressure and receives the reservoir outlet pressure from the second pressure transmitter and determines a fluid viscosity from the mass flow rate, the reservoir outlet pressure, and the Coriolis flowmeter output pressure.*

* * * * *